United States Patent
Park et al.

(10) Patent No.: US 9,325,196 B2
(45) Date of Patent: Apr. 26, 2016

(54) WIRELESS POWER TRANSMISSION APPARATUS FOR MOBILE DEVICE

(71) Applicant: SAMSUNG ELECTRONICS CO., LTD., Suwon-si (KR)

(72) Inventors: Jae Hyun Park, Yongin-si (KR); Young Ho Ryu, Yongin-si (KR); Sang Wook Kwon, Seongnam-si (KR); Ki Young Kim, Yongin-si (KR); Yun Kwon Park, Dongducheon-si (KR); Keum Su Song, Seoul (KR); Chi Hyung Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 13/960,972

(22) Filed: Aug. 7, 2013

(65) Prior Publication Data

US 2014/0049211 A1 Feb. 20, 2014

(30) Foreign Application Priority Data

Aug. 7, 2012 (KR) .................. 10-2012-0086174

(51) Int. Cl.
*H01J 7/00* (2006.01)
*H02J 7/02* (2006.01)
*H02J 5/00* (2006.01)
*H02J 7/00* (2006.01)
*B60L 11/18* (2006.01)

(52) U.S. Cl.
CPC .............. *H02J 7/025* (2013.01); *B60L 11/182* (2013.01); *B60L 11/1824* (2013.01); *B60L 11/1833* (2013.01); *B60L 11/1846* (2013.01); *H02J 5/005* (2013.01); *H02J 7/0042* (2013.01); *B60L 2210/10* (2013.01); *B60L 2210/30* (2013.01); *B60L 2210/40* (2013.01)

(58) Field of Classification Search
CPC ....... H02J 7/025; B60L 11/182; Y02T 90/122
USPC ......................................................... 320/108
See application file for complete search history.

(56) References Cited

U.S. PATENT DOCUMENTS

| | | | |
|---|---|---|---|
| 7,948,208 B2 * | 5/2011 | Partovi et al. ................. | 320/108 |
| 7,952,322 B2 * | 5/2011 | Partovi et al. ................. | 320/108 |
| 8,362,744 B2 * | 1/2013 | Terao et al. .................... | 320/108 |
| 8,901,778 B2 * | 12/2014 | Kesler et al. ................... | 307/104 |
| 2007/0222542 A1 | 9/2007 | Joannopoulos et al. | |
| 2008/0224655 A1 | 9/2008 | Tilley et al. | |
| 2009/0096413 A1 * | 4/2009 | Partovi et al. ................. | 320/108 |
| 2010/0055928 A1 * | 3/2010 | Randall ............................ | 439/1 |
| 2010/0270970 A1 * | 10/2010 | Toya et al. ...................... | 320/108 |
| 2010/0277121 A1 * | 11/2010 | Hall et al. ....................... | 320/108 |
| 2011/0050164 A1 * | 3/2011 | Partovi et al. ................. | 320/108 |

(Continued)

FOREIGN PATENT DOCUMENTS

| | | |
|---|---|---|
| JP | 2000-37047 A | 2/2000 |
| KR | 10-2004-0079134 A | 9/2004 |
| KR | 10-2011-0127814 A | 11/2011 |

*Primary Examiner* — Helen Rossoshek
(74) *Attorney, Agent, or Firm* — NSIP Law

(57) ABSTRACT

A wireless charging apparatus includes a charging unit configured to transmit power wirelessly to a mobile device, and a power supply unit configured to supply power to the charging unit. The wireless charging apparatus further includes a connecting unit configured to connect the charging unit to the power supply unit such that a position and an angle of the charging unit are adjustable.

17 Claims, 21 Drawing Sheets

(56) References Cited

U.S. PATENT DOCUMENTS

| | | | |
|---|---|---|---|
| 2011/0227527 A1* | 9/2011 | Zhu et al. | 320/108 |
| 2012/0091950 A1* | 4/2012 | Campanella et al. | 320/108 |
| 2012/0119698 A1* | 5/2012 | Karalis et al. | 320/108 |
| 2012/0153893 A1* | 6/2012 | Schatz et al. | 320/108 |
| 2012/0235634 A1* | 9/2012 | Hall et al. | 320/108 |
| 2012/0268064 A1* | 10/2012 | Ostrom et al. | 320/108 |
| 2012/0293009 A1* | 11/2012 | Kim et al. | 307/104 |
| 2013/0175873 A1* | 7/2013 | Kwon et al. | 307/104 |
| 2013/0285601 A1* | 10/2013 | Sookprasong et al. | 320/108 |
| 2013/0300206 A1* | 11/2013 | Kim et al. | 307/104 |
| 2014/0070625 A1* | 3/2014 | Kim et al. | 307/104 |
| 2014/0077613 A1* | 3/2014 | Song et al. | 307/104 |
| 2014/0152251 A1* | 6/2014 | Kim et al. | 320/108 |
| 2014/0159652 A1* | 6/2014 | Hall et al. | 320/108 |
| 2014/0197783 A1* | 7/2014 | Kim et al. | 320/108 |
| 2014/0203895 A1* | 7/2014 | Park et al. | 333/219 |
| 2014/0218517 A1* | 8/2014 | Kim et al. | 348/143 |
| 2014/0285139 A1* | 9/2014 | Ahn et al. | 320/108 |
| 2014/0375256 A1* | 12/2014 | Lee et al. | 320/108 |
| 2014/0375258 A1* | 12/2014 | Arkhipenkov et al. | 320/108 |
| 2015/0042169 A1* | 2/2015 | Park et al. | 307/104 |
| 2015/0045227 A1* | 2/2015 | Ahn et al. | 505/163 |
| 2015/0076921 A1* | 3/2015 | Park et al. | 307/104 |
| 2015/0115877 A1* | 4/2015 | Arai et al. | 320/108 |

* cited by examiner

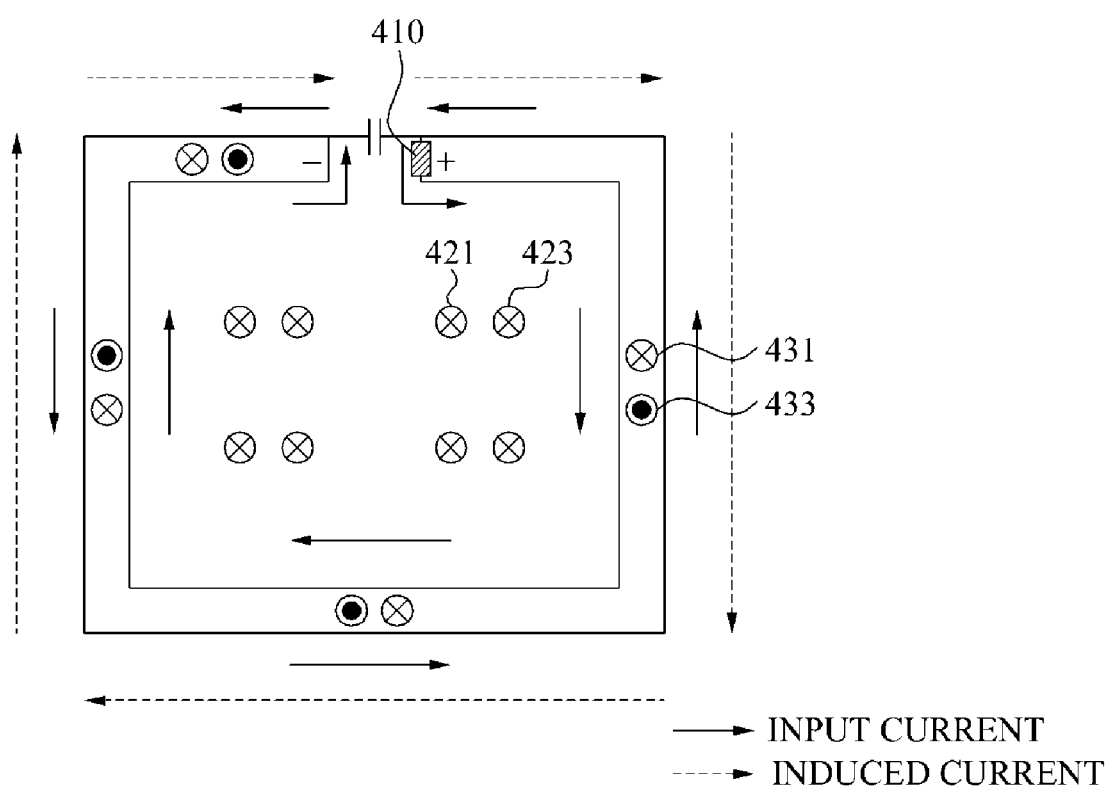

WIRELESS POWER TRANSMISSION APPARATUS FOR MOBILE DEVICE

CROSS-REFERENCE TO RELATED APPLICATION

This application claims the benefit under 35 USC 119(a) of Korean Patent Application No. 10-2012-0086174, filed on Aug. 7, 2012, in the Korean Intellectual Property Office, the entire disclosure of which is incorporated herein by reference for all purposes.

BACKGROUND

1. Field

The following description relates to a wireless power transmission apparatus for a mobile device.

2. Description of Related Art

With a recent development of information technology (IT), various portable electronic products have been released, and a number of mobile devices owned and carried by each individual has been increasing. Accordingly, technologies for replacing a desktop computer with a mobile device, including a tablet computer, are being developed.

Since such portable electronic products have become diverse and complex, an issue of charging the products has been raised. Although wireless data transmission for portable devices and home appliances is realized, use of a power cable between devices is required due to power necessities.

Recently, wireless power transmission technology has been suggested as technology for supplying power without a power cable. The wireless power transmission technology may enable easy supply of energy, when compared to a currently used wired charging system.

For example, through wireless power transmission, devices may be charged at any time and location, and an environment in which sharing power between devices without a separate power cable may be established. In addition, environmental pollution caused by used batteries may be prevented.

In general, a mobile device is small-sized and lightweight to increase portability. Accordingly, a user may change a position or angle of the device for convenience of the user when using the mobile device. As such, there is a desire for technology for transmitting optimal power while maintaining an efficiency of wireless power transmission even though a position or angle of a mobile device is changed for user convenience.

SUMMARY

In one general aspect, a wireless charging apparatus includes a charging unit configured to transmit power wirelessly to a mobile device, and a power supply unit configured to supply power to the charging unit. The wireless charging apparatus further includes a connecting unit configured to connect the charging unit to the power supply unit such that a position and an angle of the charging unit are adjustable.

In another general aspect, a wireless charging apparatus includes a charging unit configured to transmit power wirelessly to a device disposed on the charging unit and in parallel to the charging unit, and a power supply unit configured to supply power to the charging unit. The wireless charging apparatus further includes a connecting unit configured to connect the charging unit to the power supply unit such that a position of the charging unit is adjustable.

Other features and aspects will be apparent from the following detailed description, the drawings, and the claims.

BRIEF DESCRIPTION OF THE DRAWINGS

FIG. 4A is a diagram illustrating an example of a distribution of a magnetic field in a resonator that is produced by feeding of a feeding unit, of a wireless power transmitter.

DETAILED DESCRIPTION

Figure 1:
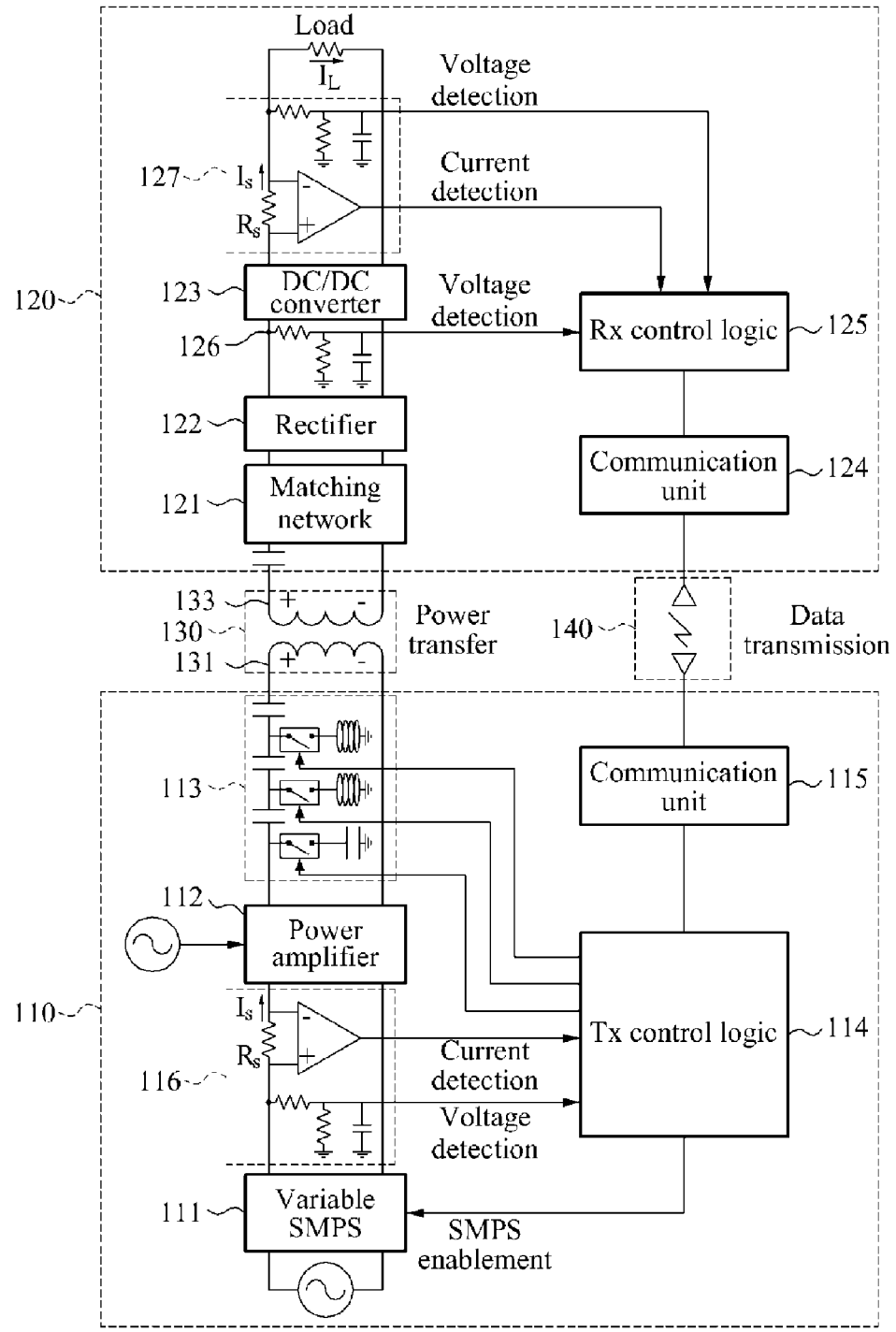
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power refers to energy that is transferred from a wireless power transmitter to a wireless power receiver through magnetic coupling. Accordingly, a wireless power charging system includes a source device and a target device.

The source device may wirelessly transmit a power, and the target device may wirelessly receive a power. The source device may be referred to as a wireless power transmitter, and the target device may be referred to as a wireless power receiver.

The source device includes a transmitting resonator, that is, a source resonator, and the target device includes a receiving resonator, that is, a target resonator. Magnetic coupling or resonance coupling may be formed between the transmitting resonator and the receiving resonator.

A scheme of performing communication between a source device and a target device may include an in-band communication scheme, and an out-band communication scheme. The in-band communication scheme means communication performed between the source device and the target device in the same frequency band as used for power transmission. The out-band communication scheme means communication performed between the source device and the target device in a separate frequency band than one used for power transmission.

FIG. 1 is a diagram illustrating an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a transmission (TX) control logic 114, a communication unit 115, a power detector 116, and a source resonator 131. The target device 120 includes a matching network 121, a rectifier 122, a direct current-to-direct current (DC/DC) converter 123, a communication unit 124, a reception (RX) control logic 125, a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the TX control logic 114.

The power detector 116 detects an output current and an output voltage of the variable SMPS 111, and provides, to the TX control logic 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The TX control logic 114 may detect a reflected wave of the communication power or a reflected wave of the charging power, and may detect mismatching between the target resonator 133 and the source resonator 131 based on the detected reflected wave. The TX control logic 114 may detect the mismatching by detecting an envelope of the reflected wave, or by detecting an amount of a power of the reflected wave.

Under the control of the TX control logic 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the TX control logic 114 through a switch, which is under the control of the TX control logic 114.

The TX control logic 114 may calculate a voltage standing wave ratio (VSWR) based on a voltage level of the reflected wave and a level of an output voltage of the source resonator 131 or the power amplifier 112. When the VSWR is greater than a predetermined value, the TX control logic 114 detects the mismatching. In this example, the TX control logic 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the TX control logic 114 may control a frequency of the switching pulse signal used by the power amplifier 112. By controlling the switching pulse signal used by the power amplifier 112, the TX control logic 114 may generate a modulation signal to be transmitted to the target device 120. In other words, the communication unit 115 may transmit various messages to the target device 120 via in-band communication. Additionally, the TX control logic 114 may detect a reflected wave, and may demodulate a signal received from the target device 120 through an envelope of the reflected wave.

The TX control logic 114 may generate a modulation signal for in-band communication using various schemes. To generate a modulation signal, the TX control logic 114 may turn on or off the switching pulse signal used by the power amplifier 112, or may perform delta-sigma modulation. Additionally, the TX control logic 114 may generate a pulse-width modulation (PWM) signal having a predetermined envelope.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the RX control logic 125. The RX control logic 125 uses the detected voltage of the input terminal 126 to compute a transmission efficiency of power received from the source device 110. Additionally, the RX control logic 125 uses the detected current and the detected voltage of the output terminal to compute an amount of power transferred to the load. The TX control logic 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the TX control logic 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the RX control logic 125 may demodulate a message received via the in-band communication.

Additionally, the RX control logic 125 may adjust an impedance of the target resonator 133 to modulate a signal to be transmitted to the source device 110. For example, the RX control logic 125 may increase the impedance of the target resonator so that a reflected wave will be detected by the TX control logic 114 of the source device 110. In this example, depending on whether the reflected wave is detected, the TX control logic 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

The TX control logic 114 sets a resonance bandwidth of the source resonator 131. Based on the resonance bandwidth of the source resonator 131, a Q-factor $Q_S$ of the source resonator 131 is set.

The RX control logic 125 sets a resonance bandwidth of the target resonator 133. Based on the resonance bandwidth of the target resonator 133, a Q-factor $Q_D$ of the target resonator 133 is set. For example, the resonance bandwidth of the source resonator 131 may be set to be wider or narrower than the resonance bandwidth of the target resonator 133.

The source device 110 and the target device 120 communicate with each other to share information about the resonance bandwidth of the source resonator 131 and the resonance bandwidth of the target resonator 133. If power desired or needed by the target device 120 is greater than a reference value, the Q-factor $Q_S$ of the source resonator 131 may be set to be greater than 100. If the power desired or needed by the target device 120 is less than the reference value, the Q-factor $Q_S$ of the source resonator 131 may be set to less than 100.

In resonance-based wireless power transmission, a resonance bandwidth is a significant factor. If Qt indicates a Q-factor based on a change in a distance between the source resonator 131 and the target resonator 133, a change in a resonance impedance, impedance-mismatching, a reflected signal, or any other factor affecting a Q-factor, Qt is inversely proportional to a resonance bandwidth as expressed by the following Equation 1:

$$\frac{\Delta f}{f_0} = \frac{1}{Qt} \qquad (1)$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between resonators, $BW_S$ denotes a resonance bandwidth of the source resonator 131, and $BW_D$ denotes a resonance bandwidth of the target resonator 133.

An efficiency U of wireless power transmission may be expressed by the following Equation 2:

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \quad (2)$$

In Equation 2, κ denotes a coupling coefficient of energy coupling between the source resonator 131 and the target resonator 133, $\Gamma_S$ denotes a reflection coefficient of the source resonator 131, $\Gamma_S$ denotes a reflection coefficient of the target resonator 133, $\omega_0$ denotes a resonance frequency, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_\kappa$ denotes a Q-factor of energy coupling between the source resonator 131 and the target resonator 133.

As can be seen from Equation 2, the Q-factor has a great effect on an efficiency of the wireless power transmission. Accordingly, the Q-factor may be set to a high value to increase the efficiency of the wireless power transmission. However, even when $Q_S$ and $Q_D$ are set to high values, the efficiency of the wireless power transmission may be reduced by a change in the coupling coefficient κ of the energy coupling, a change in a distance between the source resonator 131 and the target resonator 133, a change in a resonance impedance, impedance mismatching, and any other factor affecting the efficiency of the wireless power transmission.

If the resonance bandwidths $BW_S$ and $BW_D$ of the source resonator 131 and the target resonator 133 are set to be too narrow to increase the efficiency of the wireless power transmission, impedance mismatching and other undesirable conditions may easily occur due to insignificant external influences. In order to account for the effect of impedance mismatching, Equation 1 may be rewritten as the following Equation 3:

$$\frac{\Delta f}{f_0} = \frac{\sqrt{VSWR} - 1}{Qt\sqrt{VSWR}} \quad (3)$$

The source device 110 wirelessly transmits wake-up power used to wake up the target device 120, and broadcasts a configuration signal used to configure a wireless power transmission network. The source device 110 further receives, from the target device 120, a search frame including a receiving sensitivity of the configuration signal, and may further permit a join of the target device 120. The source device 110 may further transmit, to the target device 120, an ID used to identify the target device 120 in the wireless power transmission network. The source device 110 may further generate the charging power through a power control, and may further wirelessly transmit the charging power to the target device 120.

The target device 120 receives wake-up power from at least one of source devices, and activates a communication function, using the wake-up power. The target device 120 further receives, from at least one of the source devices, a configuration signal used to configure a wireless power transmission network, and may further select the source device 110 based on a receiving sensitivity of the configuration signal. The target device 120 may further wirelessly receive power from the selected source device 110.

In the following description, the term "resonator" used in the discussion of FIGS. 2A through 4B refers to both a source resonator and a target resonator.

Figure 2A:
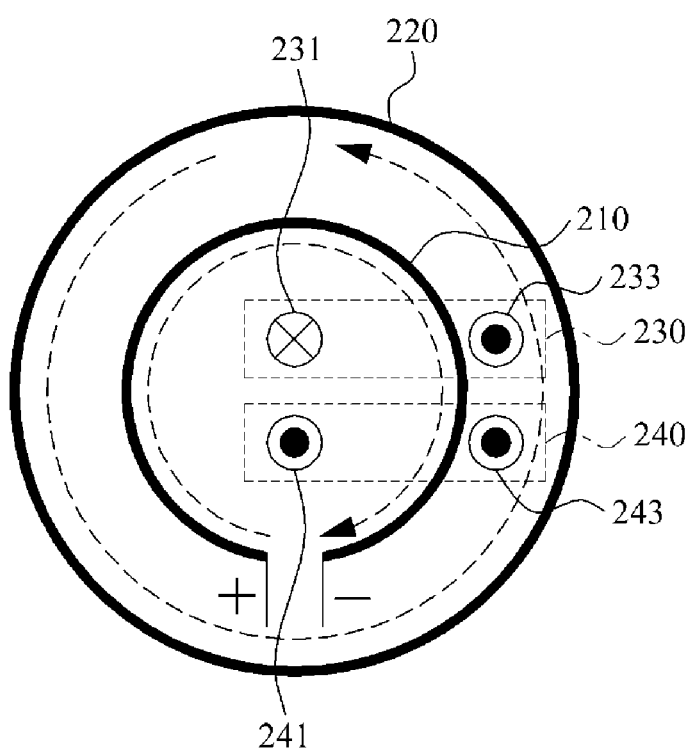
FIGS. 2A and 2B are diagrams illustrating examples of a distribution of a magnetic field in a feeder and a resonator of a wireless power resonator.
Figure 2B:
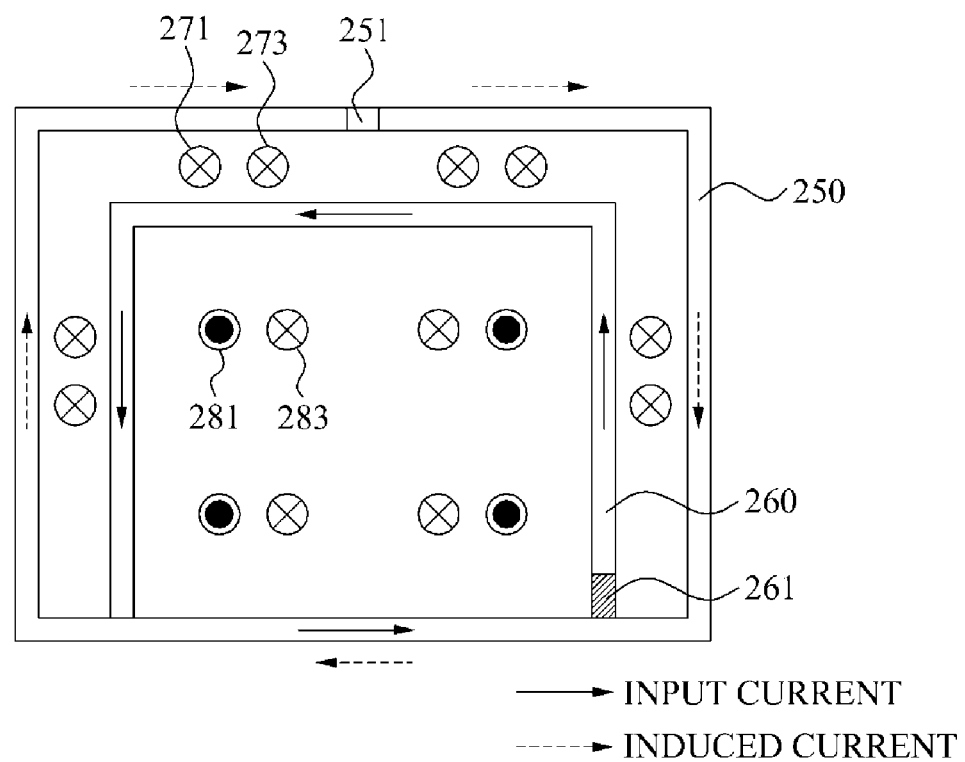

FIGS. 2A and 2B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 2A illustrates an example of a structure of a wireless power transmitter in which a feeder 210 and a resonator 220 do not have a common ground. Referring to FIG. 2A, as an input current flows into a feeder 210 through a terminal labeled "+" and out of the feeder 210 through a terminal labeled "−", a magnetic field 230 is formed by the input current. A direction 231 of the magnetic field 230 inside the feeder 210 is into the plane of FIG. 2A, and has a phase that is opposite to a phase of a direction 233 of the magnetic field 230 outside the feeder 210. The magnetic field 230 formed by the feeder 210 induces a current to flow in a resonator 220. The direction of the induced current in the resonator 220 is opposite to a direction of the input current in the feeder 210 as indicated by the dashed arrows in FIG. 2A.

The induced current in the resonator 220 forms a magnetic field 240. Directions of the magnetic field 240 are the same at all positions inside the resonator 220. Accordingly, a direction 241 of the magnetic field 240 formed by the resonator 220 inside the feeder 210 has the same phase as a direction 243 of the magnetic field 240 formed by the resonator 220 outside the feeder 210.

Consequently, when the magnetic field 230 formed by the feeder 210 and the magnetic field 240 formed by the resonator 220 are combined, a strength of the total magnetic field inside the resonator 220 decreases inside the feeder 210 and increases outside the feeder 210. In an example in which power is supplied to the resonator 220 through the feeder 210 configured as illustrated in FIG. 2A, the strength of the total magnetic field decreases in the center of the resonator 220, but increases outside the resonator 220. In another example in which a magnetic field is randomly distributed in the resonator 220, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 forms a magnetic field, and a current is induced in the resonator 250 by the magnetic field. Additionally, another magnetic field is formed by the induced current flowing in the resonator 250. In this example, a direction of the input current flowing in the feeder 260 has a phase opposite to a phase of a direction of the induced current flowing in the resonator 250. Accordingly, in a region between the resonator 250 and the feeder 260, a direction 271 of the magnetic field formed by the input current has the same phase as a direction 273 of the magnetic field formed by the induced current, and thus the strength of the total magnetic field increases in the region between the resonator 250 and the feeder 260. Conversely, inside the feeder 260, a direction 281 of the magnetic field formed by the input current has a phase opposite to a phase of a direction 283 of the magnetic field formed by the induced current, and thus the strength of the total magnetic field decreases inside the feeder 260. Therefore, the strength of the total magnetic field decreases in the center of the resonator 250, but increases outside the resonator 250.

An input impedance may be adjusted by adjusting an internal area of the feeder 260. The input impedance refers to an impedance viewed in a direction from the feeder 260 to the resonator 250. When the internal area of the feeder 260 is increased, the input impedance is increased. Conversely, when the internal area of the feeder 260 is decreased, the input impedance is decreased. Because the magnetic field is randomly distributed in the resonator 250 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 3A:
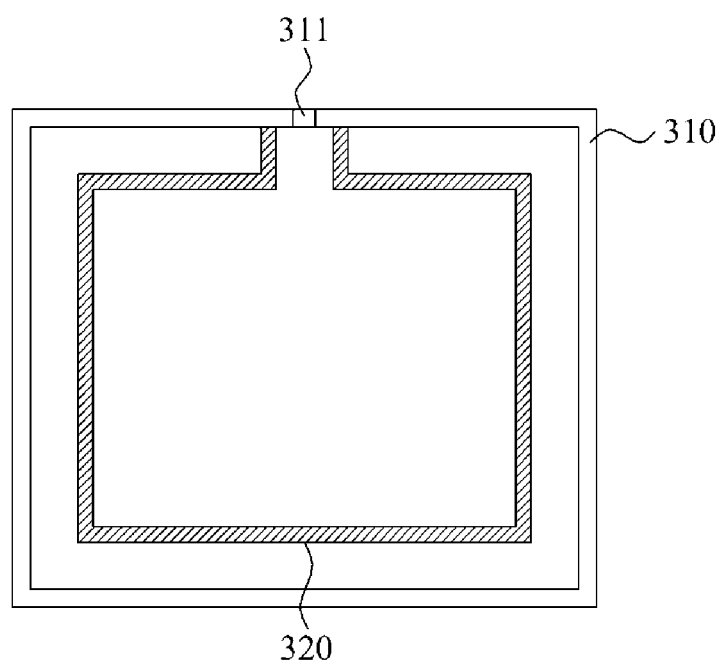
FIGS. 3A and 3B are diagrams illustrating an example of a feeding unit and a resonator of a wireless power transmitter.
Figure 3B:
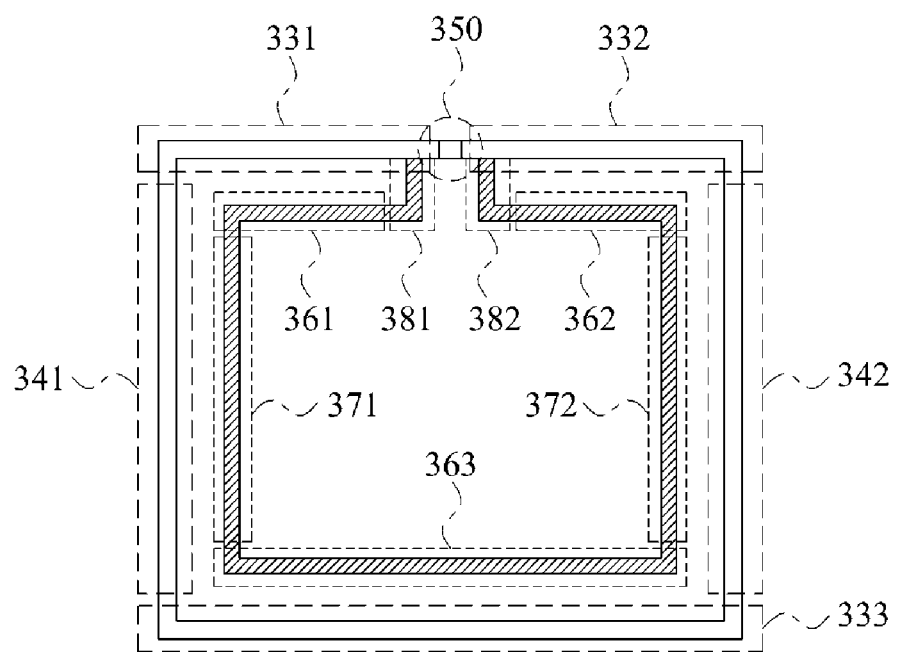

FIGS. 3A and 3B are diagrams illustrating an example of a feeding unit and a resonator of a wireless power transmitter. Referring to FIG. 3A, the wireless power transmitter includes a resonator 310 and a feeding unit 320. The resonator 310 further includes a capacitor 311. The feeding unit 320 is electrically connected to both ends of the capacitor 311.

FIG. 3B illustrates, in greater detail, a structure of the wireless power transmitter of FIG. 3A. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is inserted in series between a first signal conducting portion 331 and a second signal conducting portion 332, causing an electric field to be confined within the capacitor 350. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 3B is separated into two portions that will be referred to as the first signal conducting portion 331 and the second signal conducting portion 332. A conductor disposed in a lower portion of the first transmission line in FIG. 3B will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 in the upper portion of the first transmission line, and includes the first ground conducting portion 333 in the lower portion of the first transmission line. The first signal conducting portion 331 and the second signal conducting portion 332 are disposed to face the first ground conducting portion 333. A current flows through the first signal conducting portion 331 and the second signal conducting portion 332.

One end of the first signal conducting portion 331 is connected to one end of the first conductor 341, the other end of the first signal conducting portion 331 is connected to the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the ground conducting portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 350 inserted into the first transmission line may cause the resonator 310 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth order resonance characteristic at the target frequency, and any other suitable criterion. Based on any one or any combination of the aforementioned criteria, the capacitance of the capacitor 350 may be appropriately determined.

The resonator 310, hereinafter referred to as the MNG resonator 310, may have a zeroth order resonance characteristic of having a resonance frequency when a propagation constant is "0". If the MNG resonator 310 has the zeroth order resonance characteristic, the resonance frequency is independent of a physical size of the MNG resonator 310. By changing the capacitance of the capacitor 350, the resonance frequency of the MNG resonator 310 may be changed without changing the physical size of the MNG resonator 310.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 3B, a magnetic core passing through the MNG resonator 310 may be provided to increase a power transmission distance.

Referring to FIG. 3B, the feeding unit 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission line, and includes a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

One end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel to both ends of the capacitor 350. The fifth conductor 381 and the sixth conductor 382 are used as an input port to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeding unit 320 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 381 or the sixth conductor 382, input current flows through the feeding unit 320 and the resonator 310, generating a magnetic field that induces a current in the resonator 310. A direction of the input current flowing through the feeding unit 320 is identical to a direction of the induced current flowing through the resonator 310, thereby causing a strength of a total magnetic field to increase in the center of the resonator 310, and decrease near the outer periphery of the resonator 310.

An input impedance is determined by an area of a region between the resonator 310 and the feeding unit 320. Accordingly, a separate matching network used to match the input impedance to an output impedance of a power amplifier may not be necessary. However, if a matching network is used, the input impedance may be adjusted by adjusting a size of the feeding unit 320, and accordingly a structure of the matching network may be simplified. The simplified structure of the matching network may reduce a matching loss of the matching network.

The second transmission line, the third conductor 371, the fourth conductor 372, the fifth conductor 381, and the sixth conductor 382 of the feeding unit may have a structure identical to the structure of the resonator 310. For example, if the resonator 310 has a loop structure, the feeding unit 320 may also have a loop structure. As another example, if the resonator 310 has a circular structure, the feeding unit 320 may also have a circular structure.

FIG. 4A is a diagram illustrating an example of a distribution of a magnetic field in a resonator that is produced by feeding of a feeding unit, of a wireless power transmitter. FIG. 4A more simply illustrates the resonator 310 and the feeding unit 320 of FIGS. 3A and 3B, and the names of the various elements in FIG. 3B will be used in the following description of FIG. 4A without reference numerals.

A feeding operation may be an operation of supplying power to a source resonator in wireless power transmission, or an operation of supplying AC power to a rectifier in wireless power transmission. FIG. 4A illustrates a direction of input current flowing in the feeding unit, and a direction of induced current flowing in the source resonator. Additionally, FIG. 4A illustrates a direction of a magnetic field formed by the input current of the feeding unit, and a direction of a magnetic field formed by the induced current of the source resonator.

Referring to FIG. 4A, the fifth conductor or the sixth conductor of the feeding unit 320 may be used as an input port 410. In FIG. 4A, the sixth conductor of the feeding unit is being used as the input port 410. An RF signal is input to the input port 410. The RF signal may be output from a power amplifier. The power amplifier may increase and decrease an amplitude of the RF signal based on a power requirement of a target device. The RF signal input to the input port 410 is represented in FIG. 4A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 4A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 4A, within the feeding unit, a direction 421 of the magnetic field generated by the input current flowing in the feeding unit is identical to a direction 423 of the magnetic field generated by the induced current flowing in the resonator. Accordingly, a strength of the total magnetic field may increases inside the feeding unit.

In contrast, as illustrated in FIG. 4A, in a region between the feeding unit and the resonator, a direction 433 of the magnetic field generated by the input current flowing in the feeding unit is opposite to a direction 431 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 4A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 4B:
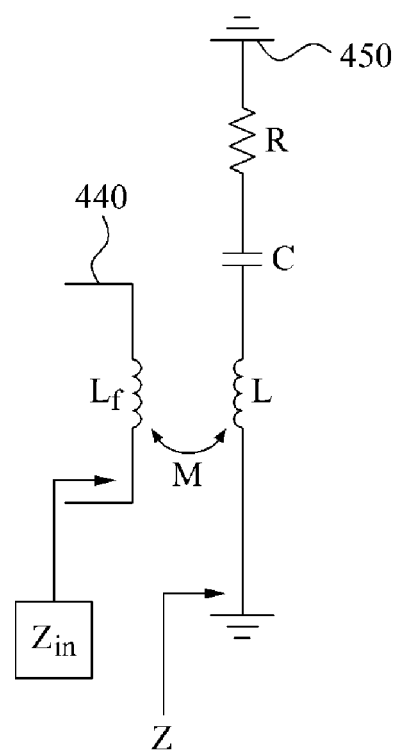
FIG. 4B is a diagram illustrating examples of equivalent circuits of a feeding unit and a resonator of a wireless power transmitter.

FIG. 4B is a diagram illustrating examples of equivalent circuits of a feeding unit and a resonator of a wireless power transmitter. Referring to FIG. 4B, a feeding unit 440 and a resonator 450 may be represented by the equivalent circuits in FIG. 4B. The feeding unit 440 is represented as an inductor having an inductance $L_f$, and the resonator 450 is represented as a series connection of an inductor having an inductance L coupled to the inductance $L_f$ of the feeding unit 440 by a mutual inductance M, a capacitor having a capacitance C, and a resistor having a resistance R. An example of an input impedance $Z_{in}$ viewed in a direction from the feeding unit 440 to the resonator 450 may be expressed by the following Equation 4:

$$Z_{in} = \frac{(\omega M)^2}{Z} \quad (4)$$

In Equation 4, M denotes a mutual inductance between the feeding unit 440 and the resonator 450, ω denotes a resonance frequency of the feeding unit 440 and the resonator 450, and Z denotes an impedance viewed in a direction from the resonator 450 to a target device. As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 440 and the resonator 450. The area of the region between the feeding unit 440 and the resonator 450 may be adjusted by adjusting a size of the feeding unit 440, thereby adjusting the mutual inductance M and the input impedance $Z_{in}$. Since the input impedance $Z_{in}$ may be adjusted by adjusting the size of the feeding unit 440, it may be unnecessary to use a separate matching network to perform impedance matching with an output impedance of a power amplifier.

In a target resonator and a feeding unit included in a wireless power receiver, a magnetic field may be distributed as illustrated in FIG. 4A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 4A, a direction of the induced current flowing in the target resonator will be identical to a direction of the induced current flowing in the feeding unit. Accordingly, for the reasons discussed above in connection with FIG. 4A, a strength of the total magnetic field will increase inside the feeding unit, and will decrease in a region between the feeding unit and the target resonator.

Figure 5:
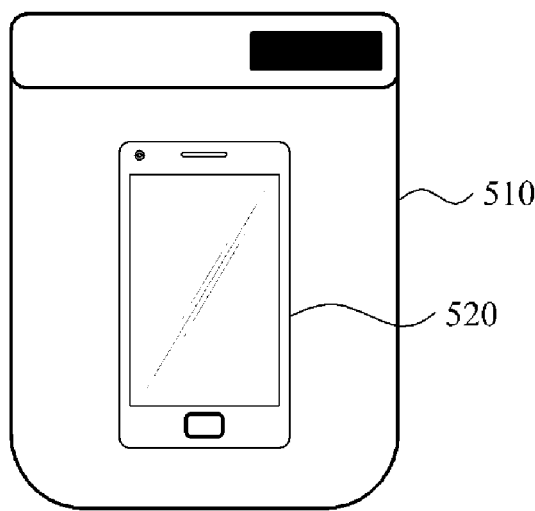
FIG. 5 is a diagram illustrating an example of an application in which a wireless power receiver and a wireless power transmitter are mounted.

FIG. 5 is a diagram illustrating an example of an application in which a wireless power receiver and a wireless power transmitter are mounted. FIG. 5 illustrates an example of performing wireless power charging between a pad 510 and a mobile device 520 as an application including a wireless power receiver and a wireless power transmitter.

Referring to FIG. 5, the wireless power transmitter is mounted in the pad 510. The wireless power receiver is mounted in the mobile device 520. The pad 510 charges the single mobile device 520.

Figure 6:
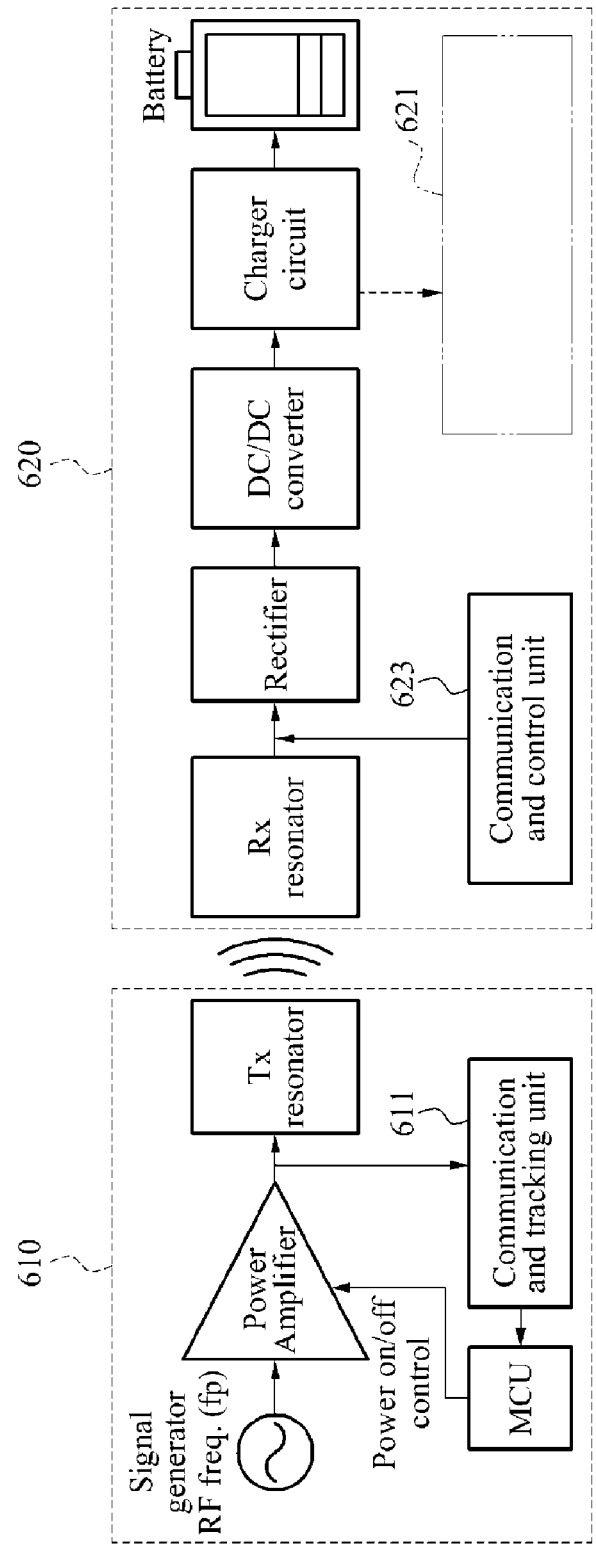
FIG. 6 is a diagram illustrating another example of a wireless power transmission system.

FIG. 6 is a diagram illustrating another example of a wireless power transmission system. Referring to FIG. 6, a wireless power transmitter 610 may be mounted in the pad 510 of FIG. 5. In addition, a wireless power receiver 620 may be mounted in the mobile device 520 of FIG. 5.

The wireless power transmitter 610 may include a similar configuration to the source device 110 of FIG. 1. For example, the wireless power transmitter 610 may include a unit configured to transmit power using magnetic coupling.

Referring to FIG. 6, the wireless power transmitter 610 includes a signal generator that generates a radio frequency (RF) frequency fp, a power amplifier (PA), a microcontroller unit (MCU), a source resonator, and a communication/tracking unit 611. The communication/tracking unit 611 communicates with the wireless power receiver 620, and controls an impedance and a resonance frequency to maintain a wireless power transmission efficiency. Additionally, the communication/tracking unit 611 may perform similar functions to the Tx control logic 114 and the communication unit 115 of FIG. 1.

The wireless power receiver 620 may include a similar configuration to the target device 120 of FIG. 1. For example, the wireless power receiver 620 may include a unit configured to wirelessly receive power and to charge a battery.

Referring to FIG. 6, the wireless power receiver 620 includes a target resonator, a rectifier, a DC/DC converter, a charger circuit, and a communication/control unit 623. The communication/control unit 623 communicates with the wireless power transmitter 610, and performs an operation to protect overvoltage and overcurrent.

The wireless power receiver 620 may include a circuit 621 that performs functions of a mobile device including a tablet computer.

Figure 7A:
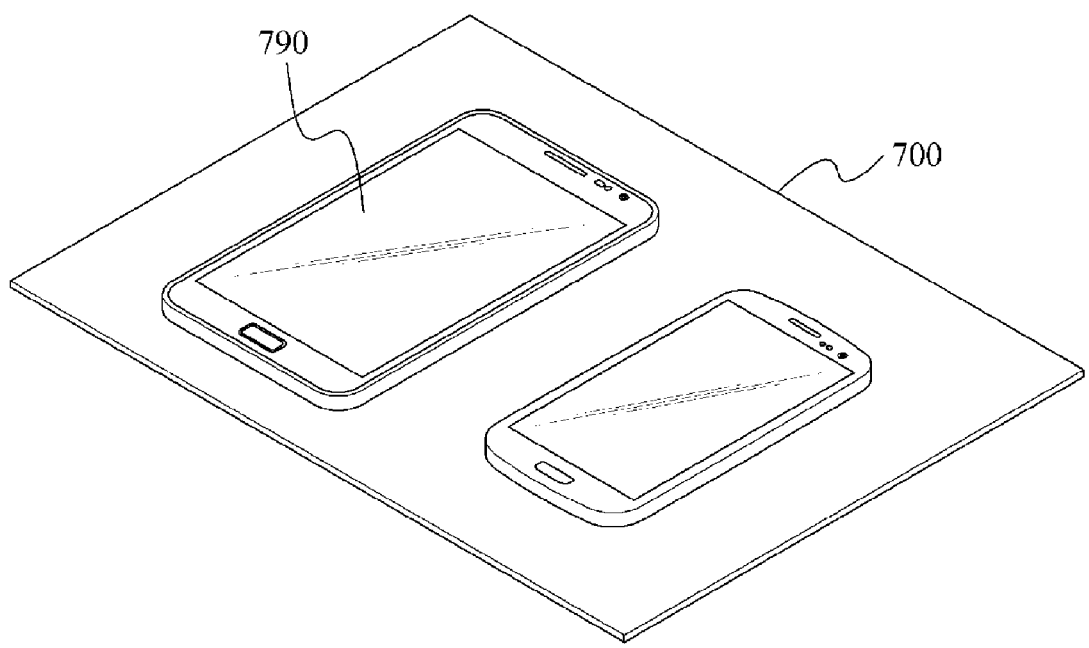
FIGS. 7A and 7B are diagrams illustrating examples of a wireless charging apparatus that charges mobile devices including a tablet computer.
Figure 7B:
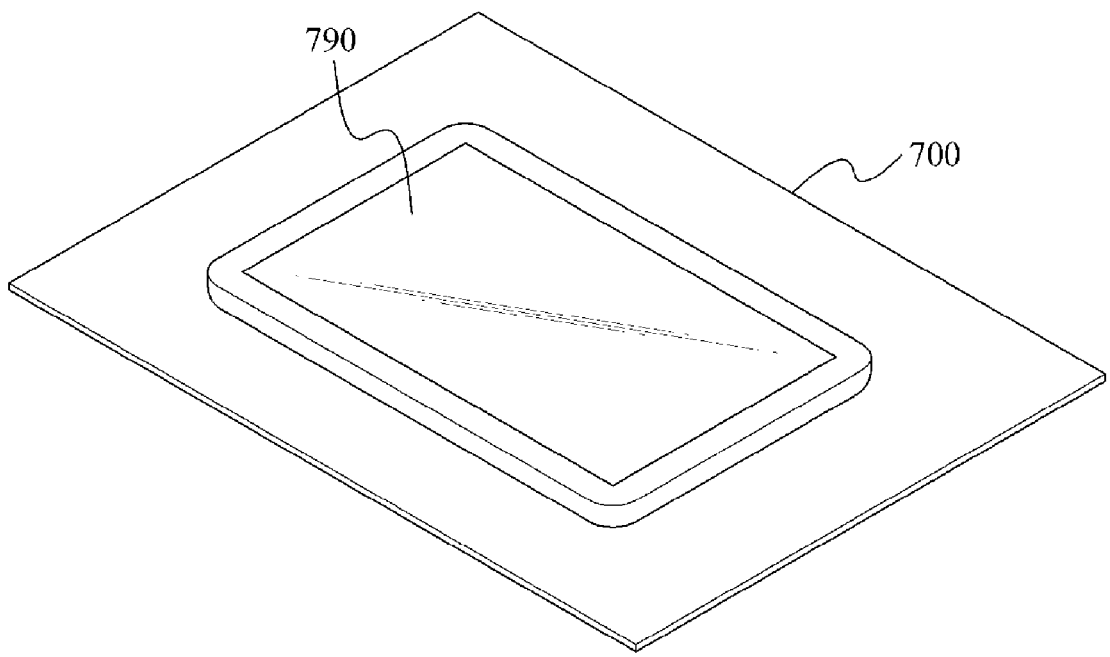

FIGS. 7A and 7B are diagrams illustrating examples of a wireless charging apparatus 700 that charges mobile devices 790 including a tablet computer. The wireless charging apparatus 700 corresponds to a wireless power transmitter.

In this example, wireless charging refers to wirelessly transmitting power to an apparatus to be charged. The power is wirelessly transmitted through a resonance between a receiving resonator, that is, a target resonator, of one of the mobile devices 790, and a transmitting resonator, that is, a source resonator, of the wireless charging apparatus 700. For example, the wireless charging apparatus 700 may wirelessly transmit power to two of the mobile devices 790 as shown in FIG. 7A. Also, the wireless charging apparatus 700 may wirelessly transmit power to one of the mobile devices 790 as shown in FIG. 7B.

In this example, the mobile devices 790 may include all electronic devices that may be portable, and each of the mobile devices 790 may include a battery to be charged and a source resonator that wirelessly receives power. For example, the mobile devices 790 may include a cellular phone, a smartphone, a tablet computer, a portable multimedia player (PMP), and/or other mobile devices known to one of ordinary skill in the art. Wireless power transmission may be optimized when any of the mobile devices 790, and the wireless charging apparatus 700, are disposed in a face-to-face arrangement, which will be described with reference to FIG. 8.

Figure 8:
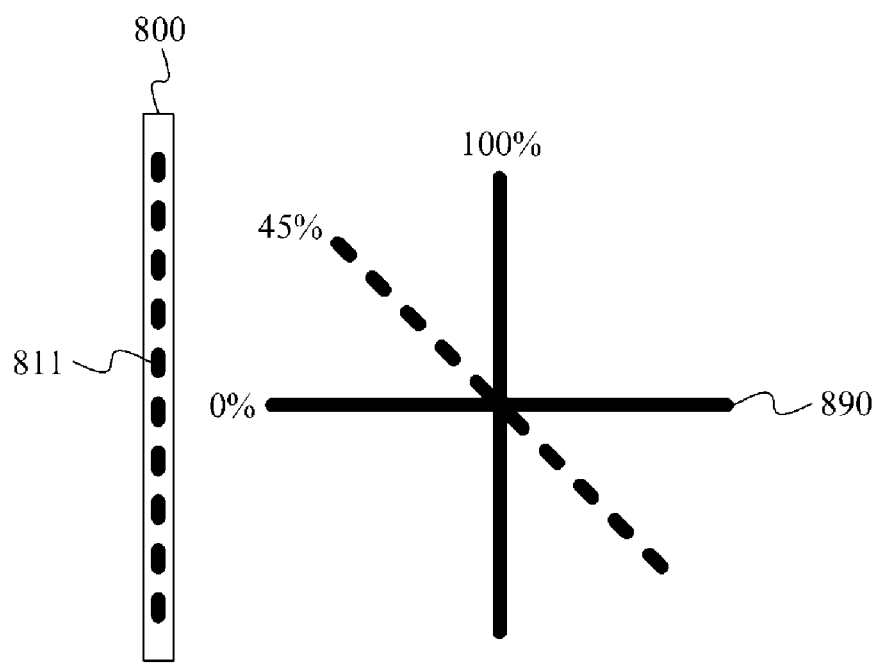
FIG. 8 is a diagram illustrating an example of an efficiency of wireless power transmission increasing or decreasing based on a transmitting angle and a receiving angle between a wireless charging apparatus and a mobile device.

FIG. 8 is a diagram illustrating an example of an efficiency of wireless power transmission increasing or decreasing based on a transmitting angle and a receiving angle between a wireless charging apparatus 800 and a mobile device 890. For example, the efficiency of wireless power transmission may increase or decrease based on an angle between a source resonator 811 of the wireless charging apparatus 800 and a target resonator of the mobile device 890.

In more detail, the efficiency of wireless power transmission of a wireless power transmission system may be proportional to a coupling coefficient K between the source resonator and the target resonator. When Kmax denotes a value of K when the source resonator and the target resonator are disposed in a face-to-face arrangement (e.g., in parallel to each other), the value of K based on an angle between the source resonator and the target resonator may be expressed, as given by the following example of Equation 5:

$$K = K\max \cdot \cos(\text{angle}) \quad (5)$$

In Equation 5, angle denotes the angle between the source resonator and the target resonator. When the angle is 0 degrees (e.g., the source resonator and the target resonator are parallel to each other), K is Kmax. When the angle is 90 degrees (e.g., the source resonator and the target resonator are perpendicular to each other), K is 0. Accordingly, as the angle between the source resonator and the target resonator increases gradually from 0 degrees to 90 degrees, the efficiency of wireless power transmission decreases gradually from 100% to 0%.

Figure 9A:
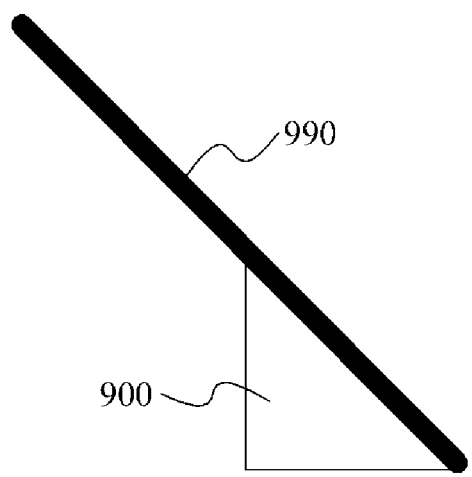
FIGS. 9A and 9B are diagrams illustrating examples of an environment in which a mobile device is used.
Figure 9B:
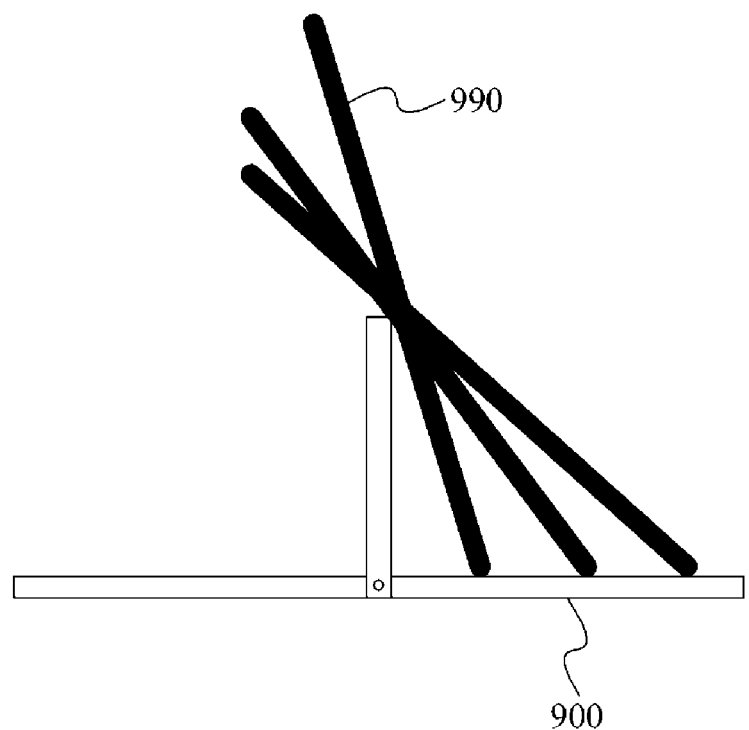

FIGS. 9A and 9B are diagrams illustrating examples of an environment in which a mobile device 990 is used. A stand 900 includes a wireless charging apparatus. A user may perform tasks while tilting the mobile device 990 against the stand 900.

Accordingly, when the wireless charging apparatus is fixed on a bottom of the stand 900 in a planar form, the user may use the mobile device 990 while tilting the mobile device 990 against the stand 900, and an angle between a source resonator of the wireless charging apparatus and a target resonator of the mobile device 990 may not be 0 degrees, but may be one of various degrees as shown in FIG. 9B. That is, when the user charges the mobile device 990 while using the mobile device 990, an efficiency of wireless power transmission may decrease based on the angle, as shown in FIG. 8.

FIGS. 10 through 13 are diagrams illustrating examples of an environment in which a mobile device is used in a wireless charging apparatus. The wireless charging apparatus may include a system unit (e.g., a power supply unit), a charging unit including a source resonator, and a connecting unit.

The charging unit may include, in an external portion of a pad, an inductor or a source resonator that may wirelessly transmit power to a mobile device through a resonance between the source resonator and a target resonator of the mobile device. The pad may support the mobile device.

The system unit may supply power to the charging unit through the connecting unit, and may include a power amplifier (PA).

The connecting unit may connect the charging unit to the system unit such that a position and an angle of the charging unit are adjusted variably. For example, the connecting unit may be used to change the angle of the charging unit and/or to rotate the charging unit in a clockwise or counterclockwise manner. In addition, a length of the connecting unit may be changeable.

Figure 10:
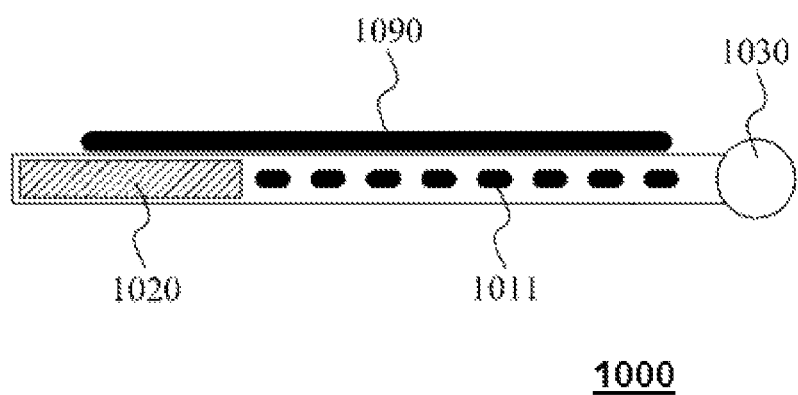
FIGS. 10 through 13 are diagrams illustrating examples of an environment in which a mobile device is used in a wireless charging apparatus.

FIG. 10 illustrates an example of a user environment in which a mobile device 1090 is charged. A user may place a wireless charging apparatus 1000 on a floor or a desk, and places the mobile device 1090 on the wireless charging apparatus 1000 to charge the mobile device 1090.

A system unit 1020 may supply power through a connecting unit 1030 to a source resonator 1011 of a charging unit, while the charging unit is folded. In this example, the source resonator 1011 and a target resonator of the mobile device 1090 are disposed in a face-to-face arrangement, e.g., in parallel to each other. Accordingly, the user may place the mobile device 1090 flat on the wireless charging apparatus 1000 to charge the mobile device 1090 at an optimal efficiency of wireless power transmission while using the mobile device 1090.

Figure 11:
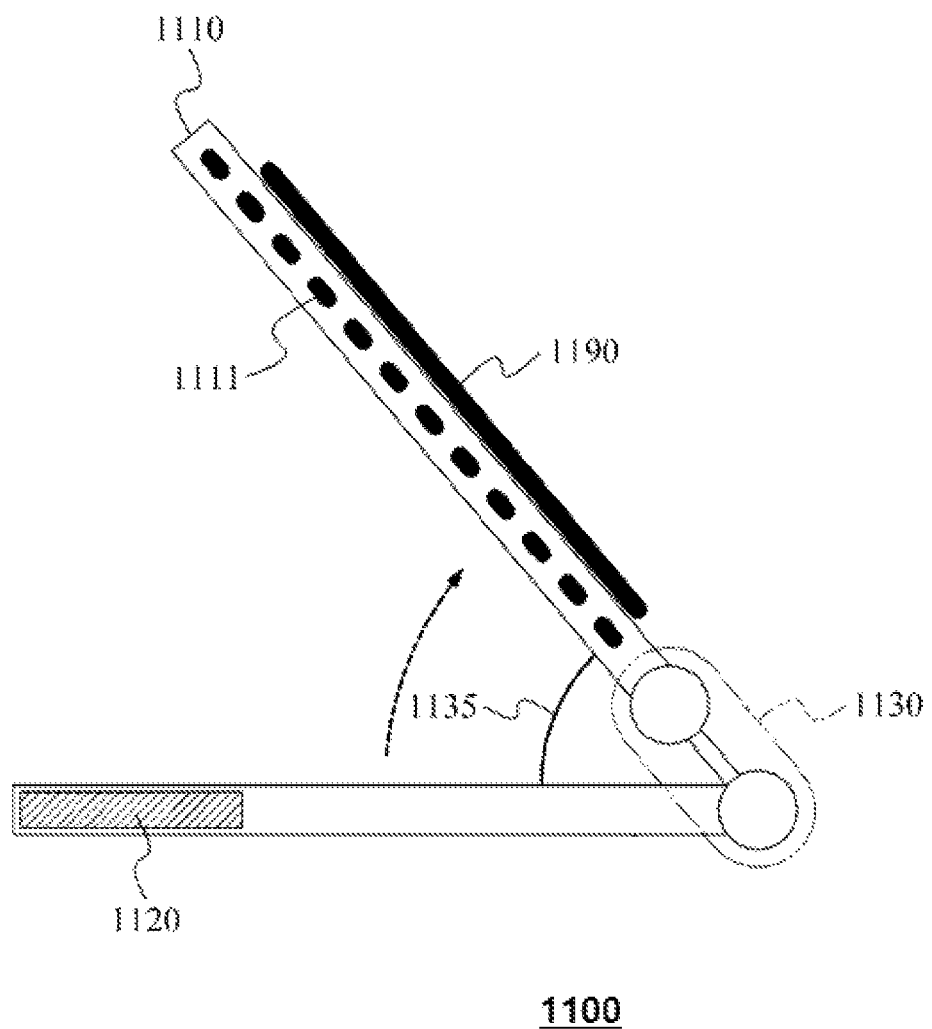

FIG. 11 illustrates an example of a user lifting, from a wireless charging apparatus 1100, a charging unit 1110 including a source resonator 1111 at a predetermined angle 1135 in order to charge a mobile device 1190 while simultaneously using the mobile device 1190. A connecting unit 1130 connects the charging unit 1110 to a system unit 1120, and may be changed (e.g., is adjustable) by the user such that the angle 1135 between a plane of the charging unit 1110 and a plane of the system unit 1120 may be changed by the user via the connecting unit 1130.

An environment in which the mobile device 1190 of FIG. 11 is used may be similar to the environment illustrated in FIGS. 9A and 9B. However, in FIG. 11, when a position of the charging unit 1110 is changed by the user via the connecting unit 1130, a face-to-face arrangement of the source resonator 1111 of the charging unit 1110 and a target resonator of the mobile device 1190 is maintained. Accordingly, the user may use the mobile device 1190 while charging the mobile device 1190 at a maximum efficiency of wireless power transmission.

Figure 12:
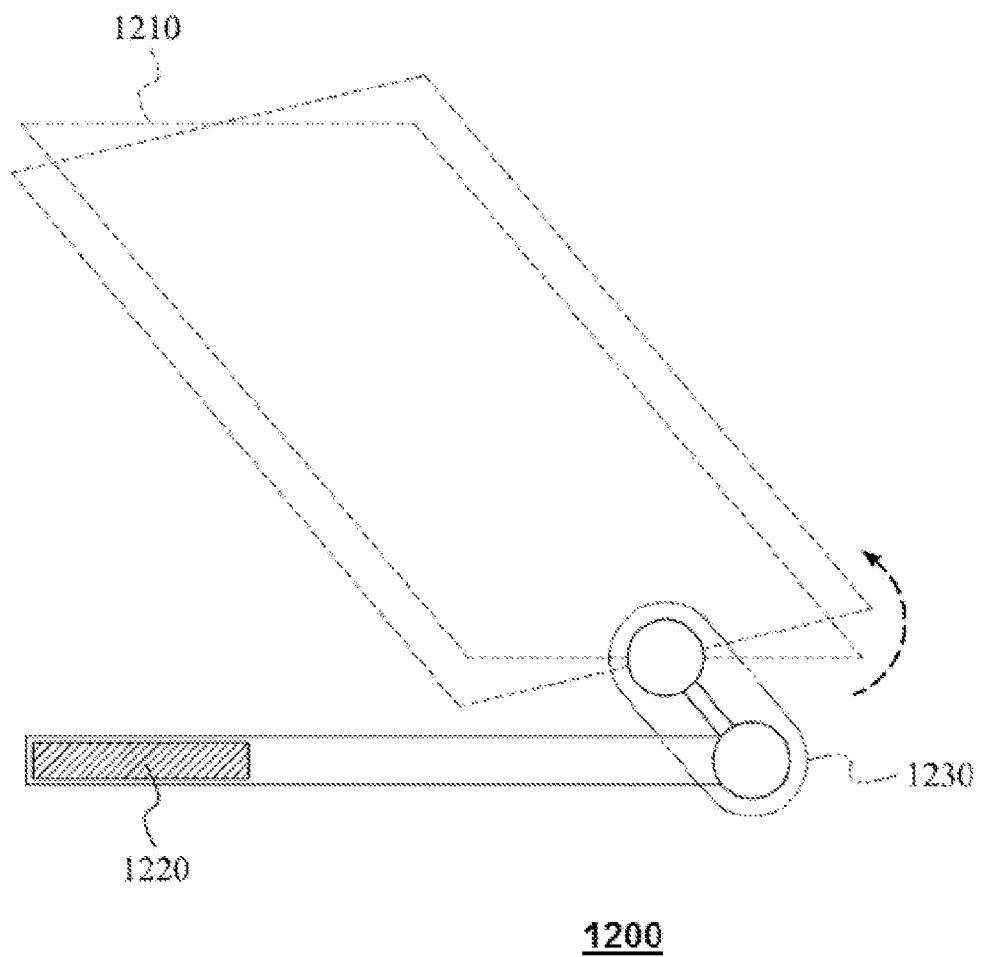

FIG. 12 illustrates an example of a user rotating a charging unit 1210 clockwise or counterclockwise in order to use a mobile device from one side of a wireless charging apparatus 1200, while charging the mobile device, without moving the wireless charging apparatus 1200. A connecting unit 1230 connects the charging unit 1210 to a system unit 1220, and may be changed (e.g., is adjustable) by the user such that, the charging unit 1210 may be rotated (e.g., is rotatable) in a clockwise or counterclockwise manner by the user via the connecting unit 1230.

In an environment illustrated in FIG. 12, a face-to-face arrangement of a source resonator of the charging unit 1210 and a target resonator of a mobile device (not shown) is maintained, even when the charging unit 1210 is rotated in a direction of the user positioned at a side of the wireless charging apparatus 1200 and is lifted from a plane of the system unit 1220 at an angle greater than a predetermined value. Accordingly, the user may use the mobile device while charging the mobile device at a maximum efficiency of wireless power transmission.

Figure 13:
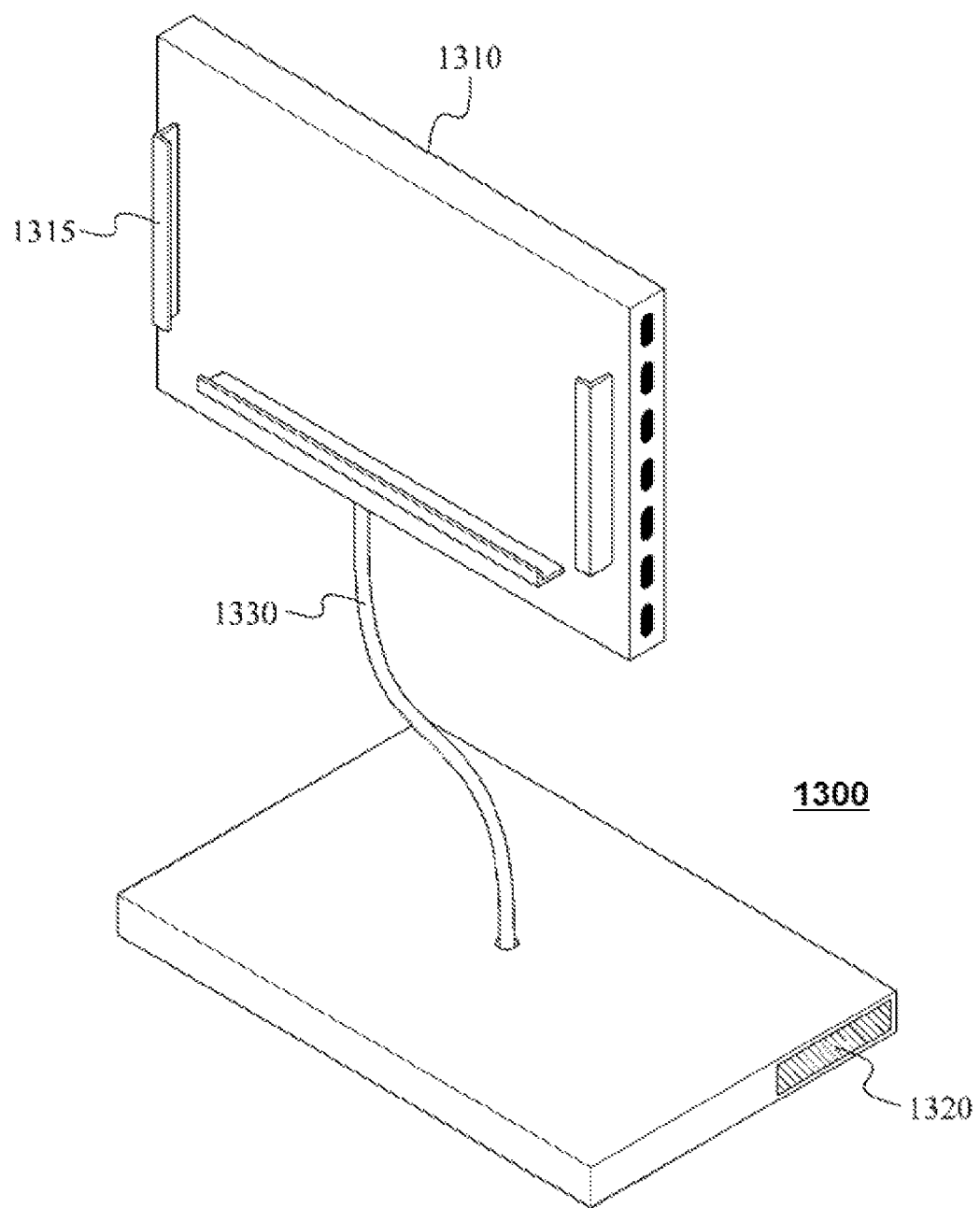

FIG. 13 illustrates an example of a stand type wireless charging apparatus 1300 including a connecting unit 1330 that connects a charging unit 1310 and a system unit 1320. The connecting unit 1330 may change form (e.g., is adjustable) flexibly to change an arrangement of the charging unit 1310 and the system unit 1320 freely. That is, the connecting unit 1330 includes a structure in which the form may be changed freely by a user, and may include a structure of a goose neck that is used for a stand or a microphone.

The charging unit 1310 includes a holder 1315 that may hold (e.g., prevent movement of) a mobile device in a predetermined position and at a predetermined angle. The holder 1315 is disposed on and protrudes from the charging unit 1310 to fix or support the mobile device in a direction normal to a direction of gravity. The holder 1315 may be manufactured using a material including a relatively great coefficient of friction, for example, rubber.

Since the holder 1315 may hold the mobile device in the predetermined position and at the predetermined angle, a face-to-face arrangement of a source resonator of the charging unit 1310 and a target resonator of the mobile device may be maintained. Accordingly, the user may use the mobile device while charging the mobile device at an optimal efficiency of wireless power transmission in any environment, even though a position and an angle of the charging unit 1310 may be changed freely by the user.

Figure 14:
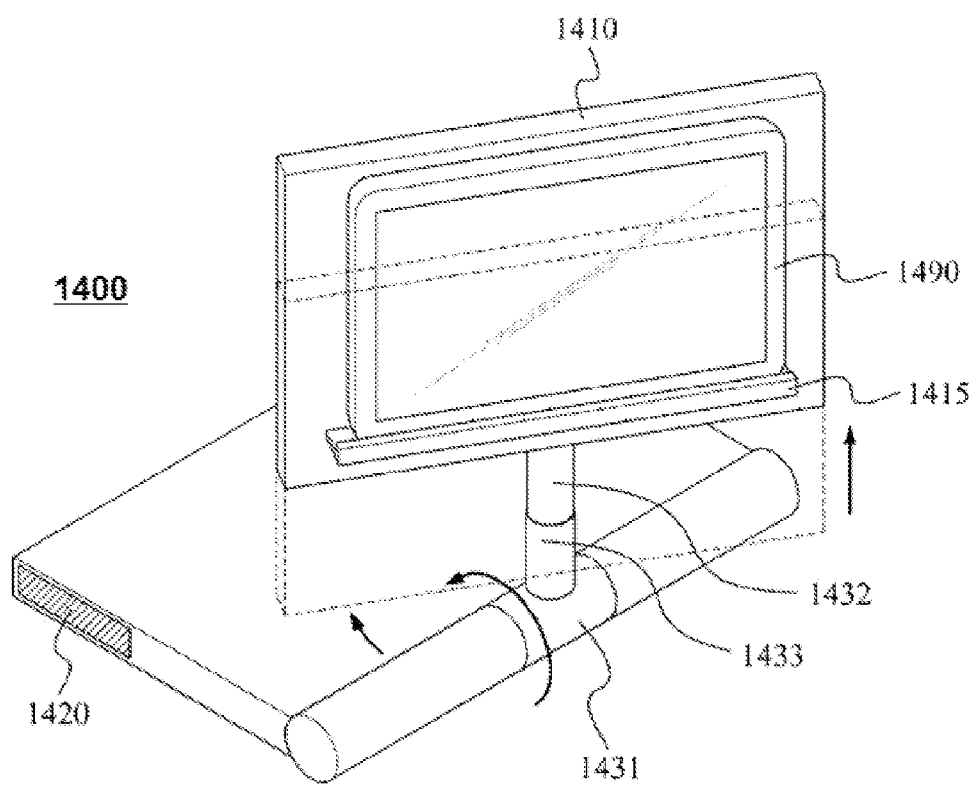
FIG. 14 is a diagram illustrating another example of an environment in which a mobile device is used in a wireless charging apparatus.

FIG. 14 is a diagram illustrating another example of an environment in which a mobile device 1490 is used in a wireless charging apparatus 1400. In this example, a length of a connecting unit of the wireless charging apparatus 1400 is changeable by a user.

Referring to FIG. 14, the wireless charging apparatus 1400 includes a charging unit 1410 including a source resonator, a system unit 1420, and a holder 1415, which may be identical to the charging unit 1110 and the system unit 1120 of FIG. 11, and the holder 1315 of FIG. 13, respectively. The wireless charging apparatus 1400 further includes the connecting unit including a first joint unit 1431, a second joint unit 1432, and an extension unit 1433.

The first joint unit 1431 includes all joint structures in which an angle between a plane of the charging unit 1410 and a plane of the system unit 1420 is changeable by the user. The second joint unit 1432 includes all joint structures in which the charging unit 1410 is rotatable clockwise or counterclockwise by the user.

However, the first joint unit 1431 and the second joint unit 1432 are not limited to be separate joint units. Instead, a single joint structure, for example, a ball joint, may simultaneously perform functions of the first joint unit 1431 and the second joint unit 1432.

The extension unit 1433 includes a structure in which the length of the connecting unit may be extended or shortened variably by the user. A power cable supplies power from the system unit 1420 to the charging unit 1410. To cope with a change in the length of the connecting unit, a portion of the power cable corresponding to a remaining length may be stored in the charging unit 1410 and/or the system unit 1420.

The connecting unit connects the charging unit 1410 to the system unit 1420, and is adjustable by the user such that a position and an angle of the charging unit 1410 may be changed freely by the user via the connecting unit, while a face-to-face arrangement of the source resonator of the charging unit 1410 and a target resonator of the mobile device 1490 is maintained. Accordingly, a user may use the mobile device 1490 while charging the mobile device 1490 at a maximum efficiency of wireless power transmission in various environments for the mobile device 1490.

Figure 15A:
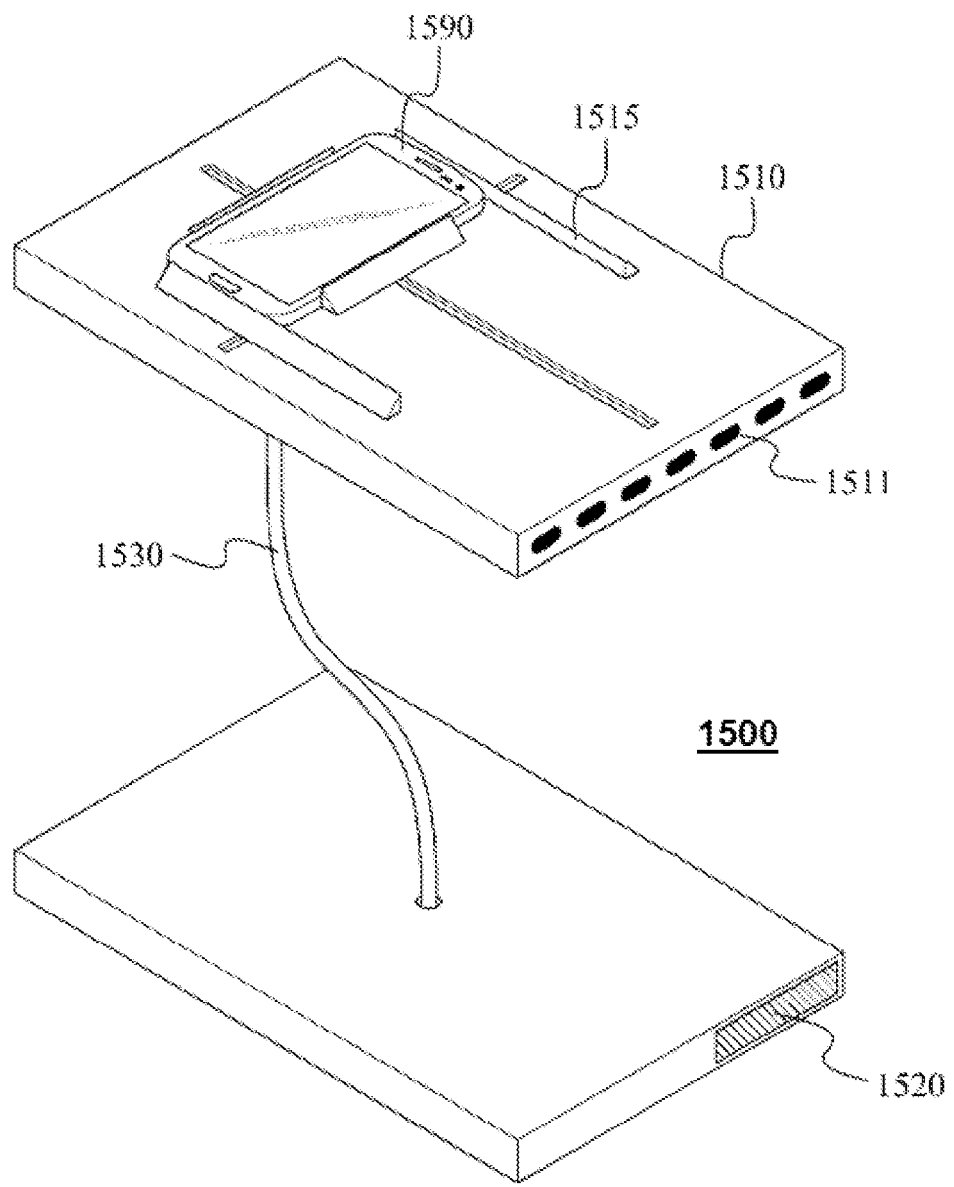
FIGS. 15A and 15B are diagrams illustrating examples of disposing a mobile device in a wireless charging apparatus.
Figure 15B:
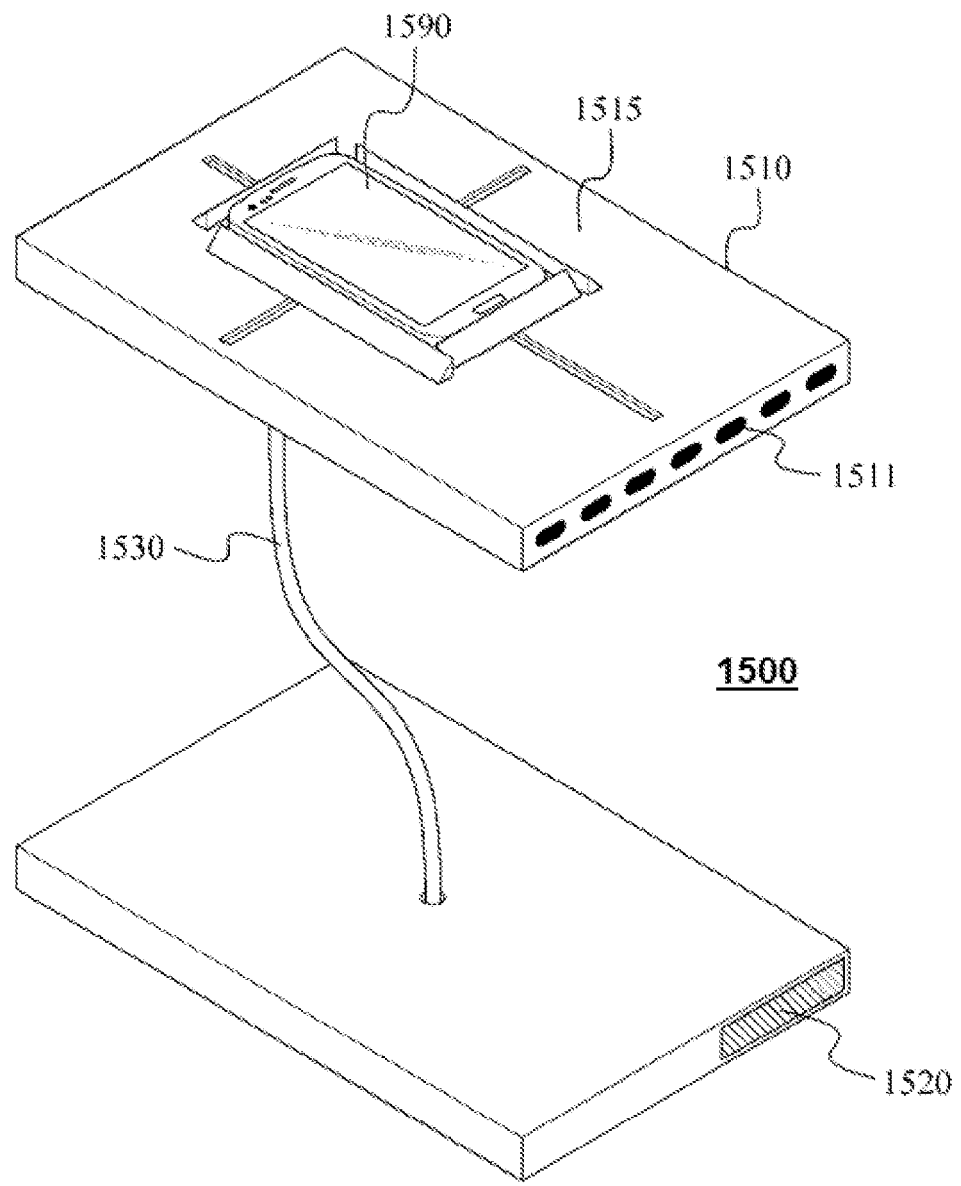

FIGS. 15A and 15B are diagrams illustrating examples of disposing a mobile device 1590 in a wireless charging apparatus 1500. In these examples, the wireless charging apparatus 1500 includes a charging unit 1510 including four holders 1515 such that the mobile device 1590 is arranged horizontally, vertically, or in other directions on the charging unit 1510.

FIG. 15A illustrates an example of disposing the mobile device 1590 in a vertical direction, and FIG. 15B illustrates an example of disposing the mobile device 1590 in a horizontal direction. For example, irrespective of the disposition of the mobile device 1590, the four holders 1515 are placed on predetermined positions, for example, on an upper side, a lower side, a left side, and a right side, of the mobile device 1590 to support the mobile device 1590. As illustrated in FIGS. 15A and 15B, the four holders 1515 are placed along grooves formed on the charging unit 1510 to fix the mobile device 1590 on the charging unit 1510. However, a form of the holders 1515 and a number of the holders 1515 are not limited to the example provided above. The form and the number of the holders 1515 may vary sufficiently to fix the mobile device 1590 on the charging unit 1510 firmly.

The wireless charging apparatus 1500 further includes a source resonator 1511 of the charging unit 1510, a system unit 1520, and a connecting unit 1530 that may correspond to the source resonator of the charging unit 1310, the system unit 1320, and the connecting unit 1330, respectively, of FIG. 13. Since the holders 1515 hold the mobile device 1590 in a position on the charging unit 1510, a face-to-face arrangement of the source resonator 1511 of the charging unit 1510 and a target resonator of the mobile device 1590 is maintained. Accordingly, a user may use the mobile device 1590 while charging the mobile device 1590 at an optimal efficiency of wireless power transmission in any environment, even though a position and an angle of the charging unit 1510 may be changed freely by the user.

The examples of a position and an angle of a charging unit in a wireless charging apparatus described may be changed freely, while a mobile device may be charged wirelessly and efficiently, in consideration of user convenience. That is, the position and the angle of the charging unit in the wireless charging apparatus may be changed freely, while a face-to-face arrangement of a source resonator and a target resonator is maintained, whereby the mobile device may be charged wirelessly at a maximum efficiency of wireless power transmission.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless charging apparatus comprising:
a charging unit configured to transmit power wirelessly to a mobile device;
a power supply unit configured to supply power to the charging unit; and
a connecting unit configured to connect the charging unit to the power supply unit such that an angle between the charging unit and the power supply unit is adjustable,
wherein the connecting unit is adjustable flexibly to adjust an arrangement of the charging unit and the power supply unit freely.

2. The wireless charging apparatus of claim 1, wherein a resonator of the mobile device is disposed on a resonator of the charging unit in a face-to-face arrangement to maximize an efficiency of the transmission.

3. The wireless charging apparatus of claim 1, wherein the connecting unit is further configured to connect the charging unit to the power supply unit such that an angle between a plane of the charging unit and a plane of the power supply unit is adjustable.

4. The wireless charging apparatus of claim 1, wherein the connecting unit is further configured to connect the charging unit to the power supply unit such that the charging unit is rotatable clockwise or counterclockwise.

5. The wireless charging apparatus of claim 1, wherein a length of the connecting unit is adjustable.

6. The wireless charging apparatus of claim 1, wherein the mobile device is disposed horizontally or vertically on the charging unit.

7. The wireless charging apparatus of claim 1, wherein the charging unit comprises an inductor or a resonator configured to transmit the power wirelessly to the mobile device.

8. The wireless charging apparatus of claim 1, wherein the charging unit comprises a holder configured to prevent movement of the mobile device disposed on the charging unit.

9. The wireless charging apparatus of claim 1, wherein a resonator of the mobile device is disposed on a resonator of the charging unit, and an angle between the resonator of the mobile device and the resonator of the charging unit is 0 degrees.

10. A wireless charging apparatus comprising:
a charging unit configured to transmit power wirelessly to a device disposed on the charging unit and in parallel to the charging unit;
a power supply unit configured to supply power to the charging unit; and
a connecting unit configured to connect the charging unit to the power supply unit such that an angle between the charging unit and the power supply unit is adjustable,
wherein the connecting unit is adjustable flexibly to adjust an arrangement of the charging unit and the power supply unit freely.

11. The wireless charging apparatus of claim 10, wherein a resonator of the device is disposed on a resonator of the charging unit, and an angle between the resonator of the device and the resonator of the charging unit is 0 degrees.

12. The wireless charging apparatus of claim 10, wherein the connecting unit is further configured to connect the charging unit to the power supply unit such that the position of the charging unit is adjustable and the device is maintained in parallel to the charging unit.

13. The wireless charging apparatus of claim 10, wherein the charging unit comprises a holder configured to hold the device in a position on the charging unit.

14. The wireless charging apparatus of claim 10, wherein the connecting unit comprises a second joint unit configured to connect the charging unit to the power supply unit such that an angle between a plane of the charging unit and a plane of the power supply unit is adjustable.

15. The wireless charging apparatus of claim 10, wherein the connecting unit comprises a first joint unit configured to connect the charging unit to the power supply unit such that the charging unit is rotatable clockwise or counterclockwise.

16. The wireless charging apparatus of claim 10, wherein the connecting unit comprises an extension unit configured to connect the charging unit to the power supply unit such that a length of the connecting unit is adjustable.

17. The wireless charging apparatus of claim 10, wherein the charging unit comprises grooves, and holders disposed in the grooves and configured to hold the device horizontally or vertically in an adjustable position on the charging unit.

* * * * *